United States Patent [19]
Mohebbi et al.

[11] Patent Number: 5,870,900
[45] Date of Patent: Feb. 16, 1999

[54] THERMAL CAPACITIVE CONTROL SYSTEM FOR A MULTI-COMPARTMENT REFRIGERATOR

[75] Inventors: Behrooz Mohebbi, Peoria, Ill.; Michael J. Kempiak, Osceola, Ind.

[73] Assignee: Maytag Corporation, Newton, Iowa

[21] Appl. No.: 869,249

[22] Filed: Jun. 4, 1997

[51] Int. Cl.$^6$ ..................................................... F25D 17/04
[52] U.S. Cl. .................................. 62/187; 62/408; 62/441
[58] Field of Search .............................. 62/187, 404, 407, 62/408, 441; 236/990, DIG. 7, DIG. 11

[56] References Cited

U.S. PATENT DOCUMENTS

| | | |
|---|---|---|
| 2,820,839 | 1/1958 | Schunke . |
| 2,930,827 | 3/1960 | Schunke . |
| 3,288,370 | 11/1966 | Mingrone et al. ......................... 62/187 |
| 3,403,533 | 10/1968 | Bollenbacher . |
| 3,630,046 | 12/1971 | Boor . |
| 3,908,392 | 9/1975 | Schumacher . |
| 3,918,269 | 11/1975 | Summers et al. . |
| 4,009,590 | 3/1977 | Webb et al. .............................. 62/187 |
| 4,009,591 | 3/1977 | Hester . |
| 5,385,032 | 1/1995 | Martin . |

FOREIGN PATENT DOCUMENTS

| | | |
|---|---|---|
| 477133 | 3/1992 | European Pat. Off. . |
| 1218280 | 5/1960 | France . |
| 6605746 | 10/1966 | Netherlands . |

OTHER PUBLICATIONS

English Abstract for JP Patent Publication No. 0114732 dated Sep. 1981.

*Primary Examiner*—John M. Sollecito
*Attorney, Agent, or Firm*—Everett G. Diederiks, Jr.

[57] ABSTRACT

A system for controlling temperatures in and the flow of air between freezer and fresh food compartments of a refrigerator incorporates a thermal mass that is adapted to receive a flow of air directed from the freezer compartment to the fresh food compartment. The thermal mass is associated with a temperature sensor that is connected to a manually adjustable thermostat unit. In the preferred embodiment, the temperature sensor comprises a capillary tube which is wrapped around an outer surface portion of the thermal mass. Structure is provided in the air passageway between the freezer and fresh food compartments to regulate the flow of air over the thermal mass. By regulating the flow over the thermal mass, as well as establishing a desired thermal mass size and location, the control system can achieve desired operational cycles in order to minimize energy consumption and to minimize any variance of the number of cycles over a given period of time between various refrigerator units.

15 Claims, 4 Drawing Sheets

THERMAL CAPACITIVE CONTROL SYSTEM FOR A MULTI-COMPARTMENT REFRIGERATOR

BACKGROUND OF THE INVENTION

1. Field of the Invention

The present invention pertains to the art of multi-compartment refrigerators in which a portion of the air being circulated in one compartment in diverted, through an air passageway formed in a partition wall, into the other compartment and, more particularly, to a system for controlling the temperature in each compartment and the flow of air between the two compartments.

2. Discussion of the Prior Art

In typical household refrigerators having partitioned freezer and fresh food compartments, air is generally circulated over an evaporator and then delivered to both the freezer compartment and the fresh food compartment. Typically, one or more user operated temperature controllers are provided in order to manually adjust the desired temperature ranges for the two compartments. In a common temperature control system, one control member is used for controlling the freezer compartment temperature, while the other control member controls the fresh food compartment temperature. In certain known prior art arrangements, the fresh food control is operatively connected to a thermostat unit that senses the temperature in the fresh food compartment by means of a capillary tube that is connected to the thermostat unit and routed to a predetermined location within the fresh food compartment. With this arrangement, the fresh food control thermostatically maintains the fresh food compartment temperature by periodically energizing and de-energizing a compressor of a refrigeration circuit.

In such a known arrangement, it is also common to connect the freezer control to an air flow damper positioned in the passageway which delivers air from the freezer to the fresh food compartment. As the freezer control is set to a cold position, the damper is moved to allow less air into the fresh food compartment and the fresh food control responds by increasing the active time of the compressor to maintain the temperature in the fresh food compartment and thereby indirectly cools the freezer compartment. Conversely, if the freezer control is set to a less cold position, the damper moves to allow more air to be sent from the freezer to the fresh food compartment and, correspondingly, the fresh food compartment control compensates by running the compressor less often.

Of course, the higher the number of cycles run by the refrigeration circuit over a given time period equates to a higher energy consumption for the refrigerator. It is desirable to provide a temperature control system which can be used to establish the optimal number of operating cycles in order to minimize energy consumption. Unfortunately, a set optimum number of cycles cannot be predetermined as system cycling will depend upon numerous factors, including the environment in which the refrigerator is used, the frequency in which the compartments of the refrigerator are accessed and the size of the refrigerator compartments. Of additional concern is the variance of the cycles over a given time period from one cabinet to the next.

Based on the above, there exists a need in the art for a refrigerator temperature control system which can be used to effectively maintain desired freezer and fresh food compartment temperatures while regulating the refrigeration circuit cycling in the manner which minimizes energy consumption.

SUMMARY OF THE INVENTION

The present invention is directed to a system for controlling temperatures in and the flow of air between freezer and fresh food compartments of a refrigerator, wherein the system is designed to achieve a desired number of cycles per day for minimal energy consumption. The system includes a temperature sensor having one end portion attached to a temperature control unit and a second end portion exposed to a flow of air coming through an air passageway connecting the freezer compartment to the fresh food compartment. This end portion of the temperature sensor is actually wrapped around a thermal mass element that is preferably positioned at an air inlet to the fresh food compartment such that the thermal mass is exposed to the air flow coming into the fresh food compartment. The amount of air flow to the mass is also regulated to control the thermal biasing of the mass.

The control system of the present invention is applicable to various styles of refrigerators, including top mount and side-by-side models. In either case, the air flow is preferably regulated by incorporating a damper system within the air passageway. In a preferred top mount style refrigerator embodiment, a damper system, including a rotatably mounted baffle and a air diverter located downstream of the baffle, directs a regulated flow of air towards the thermal mass. Actually, the amount of air flow to the mass is controlled by the size of an air flow opening associated with the diverter and the position of the baffle. In this sense, the damper arrangement controls both the total amount of air flow from the freezer compartment to the fresh food compartment and also controls the amount of air to the thermal mass.

In the preferred embodiment of a side-by-side design, the damper arrangement includes a pivoting baffle plate that controls the flow of air through the air passageway from the freezer compartment and the thermal mass is mounted under a diffuser member which functions to limit the air velocity to the mass while the refrigeration circuit is activated. In addition, the diffuser reduces the warming of the mass during off cycling times by restricting air movement near the mass. In the preferred embodiment, the diffuser is constituted by a plastic plate that functions as a roof over the thermal mass and which is provided with a plurality of spaced holes for regulating the amount of air directed over the thermal mass. In addition, the holes of the diffuser are spaced to reduce the possibility of ice/moisture formation. Furthermore, the diffuser is preferably provided with side ports to allow air flow to drop down into the fresh food compartment around the thermal mass as well. The side ports aid in reducing temperature stratification within the fresh food compartment.

Regardless of the specific design and style of refrigerator to which the control system of the present invention is applied, the system functions in the same manner and allows more flexibility in the control of the compartment temperatures, as well as the overall refrigerator performance. By simply altering the thermal mass size, location and damper design, the variance in cycles over a given unit of time between various refrigerator cabinet sizes and style can be minimized, while increasing sensed temperature response at the end of on and off cycles of the refrigeration circuit due to the presence of the thermal mass. Although the control system does not maintain corresponding compartment temperatures between various refrigerators placed in different ambient environments, the control system can lead to nearly equal temperature changes in both compartments by simply controlling the mass size, location and damper design.

Additional objects, features and advantages of the present invention will become more readily apparent from the following description of preferred embodiments thereof when taken in conjunction with the drawings wherein like reference numerals refer to corresponding parts in the several views.

DETAILED DESCRIPTION OF THE PREFERRED EMBODIMENTS

Figure 1:
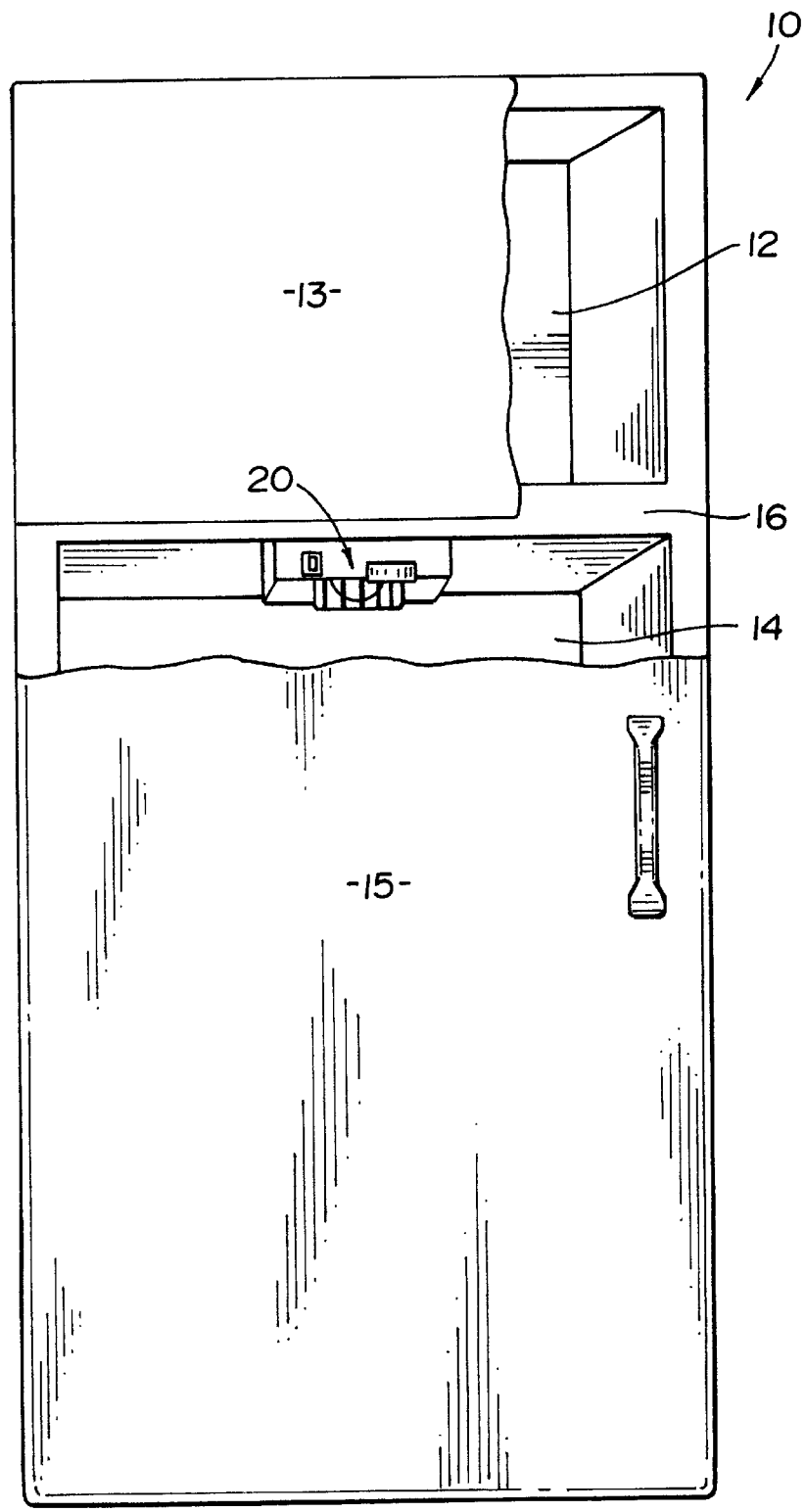
FIG. 1 is a front perspective view of a top mount refrigerator incorporating a system for controlling temperatures in and a flow of air between freezer and fresh food compartments of the refrigerator according to a first preferred embodiment of the invention.

With initial reference to FIG. 1, a top mount refrigerator is generally indicated at 10 and includes a relatively low temperature freezer compartment 12 adapted to be selectively sealed by a door 13 and a relatively high temperature fresh food compartment 14 having an associated door 15. Compartments 12 and 14 are separated by an insulated partition or mullion 16 having a vertical opening (not shown) therein. An evaporator (also not shown), for use in refrigerating the two compartments 12 and 14 in a manner known in the art, is housed in either the mullion 16 or in a back portion of the freezer. In any event, it should be understood that refrigerator 10 incorporates a conventional closed refrigerant circuit (not shown) comprising the usual compressor, condenser etc. that is linked to the evaporator. As also known in the art, refrigerator 10 incorporates an air circulating system (not shown) including a fan for directing air to the evaporator and then to the freezer compartment 12 with most of the air simply returning to the evaporator, while a portion of the air is directed to the fresh food compartment 14 through a temperature control unit 20 for controlling the air temperature in, and the air flow between, freezer and fresh food compartments 12 and 14. It is this temperature control unit 20, as well as the system incorporated therein, to which the present invention is directed as will be detailed below.

In FIG. 1, control unit 20 is shown mounted below mullion 16. As can be best seen in FIG. 2, control unit 20 includes a control housing 22 which is preferably formed from a single, plastic injection molded piece. Control housing 22 includes a first end portion 26, a central portion 27 and a second end portion 28. Mounted within first end portion 26 is a thermostat unit 32 that can be adjusted by means of a manually rotatable operator control 35. Control 35 projects out a recessed area 37, formed in a lower portion of the front wall 38 of control housing 22, for ease of manipulation. Although control 35 is disclosed as being a rotary member, other control elements could also be utilized, including a slidably mounted control element. Also attached to first end portion 26 is a light switch 40 that is preferably snap-fit into an opening 42 provided in front wall 38.

Beneath central portion 27 and exposed to the interior of fresh food compartment 14 is a lighting assembly that includes a barrier foil 46, a socket defining element 48, a bulb 49 and a guard 50. For the sake of completeness, central portion 27 also preferably houses a defrost timer 54.

Second end portion 28 of control housing 22 defines a chamber 57 that aids in defining an air passageway between freezer compartment 12 and fresh food compartment 14. More specifically, chamber 57 is adapted to receive a lower insulating insert 61, an intermediate insulating insert 63, a damper unit 66 and an upper insulating insert 68. Although not separately labeled, upper insulating insert 68, damper unit 66 and intermediate insulating insert 63 are clearly shown in this figure to include central openings which actually define the air passageway between freezer compartment 12 and fresh food compartment 14. Damper unit 66 is adapted to have rotatably mounted therein a baffle member (not shown), the position of which can be adjusted to alter the size of the passageway leading from freezer compartment 12 to fresh food compartment 14 in a manner known in the art. As also known in the art, the position of the baffle member can be controlled automatically or preferably through the use of a separate manual control element that, at least in the present refrigerator temperature control embodiment disclosed, will be mounted in the freezer compartment 12. Since the control of the baffle member is not considered part of the present invention and is widely known in the art, it will not be further described herein.

However, in accordance with the present invention, damper unit 66 is provided with a lower scoop or diverter portion 73 that is adapted to receive a flow of air through the air passageway from the freezer compartment 12 to the fresh food compartment 14. Diverter 73 includes a side opening 77 that is aligned with a side discharge opening 80 formed in second end portion 28 of control housing 22. In this manner, side discharge opening 80 constitutes an air inlet area to fresh food compartment 14. On either side of side discharge opening 80, control housing 22 is preferably formed with a pair of outwardly projecting leg members 83 and 84. Leg members 83 and 84 are adapted to support a thermal mass 86 in accordance with the present invention, such that thermal mass 86 is exposed to air flowing through side discharge opening 80. In accordance with the preferred embodiment, thermal mass 86 is formed of aluminum, although other materials could be utilized within the scope of the invention.

Wrapped around thermal mass 86 is a first end portion 89 of a temperature sensor 91. In the preferred embodiment, temperature sensor 91 constitutes a capillary tube. From first end portion 89, capillary tube 91 extends into central portion 27 through a cut-out section 93 of control housing 22. As clearly shown in FIG. 2, a covering 96 is preferably provided along a substantial portion of capillary tube 91, particularly through central portions 27 and first end portion 26. Capillary tube 91 is directed into first end portion 26 through an elongated channel 99 formed at one side of central portion 27 of control housing 22. Actually, electrical wires of temperature control unit 20 are also preferably routed within elongated channel 99 with capillary tube 91 extending above these wires. In any event, capillary tube 91 includes a first end portion 102 that is attached to thermostat unit 32.

As indicated above, the present invention is particularly directed to the presence of the thermal mass 86, the manner in which it receives a direct flow of air through diverter portion 73 of damper unit 66 and the manner in which the presence of the thermal mass affects temperature readings through capillary tube 91 to adjust the overall temperatures in and the flow of air between freezer compartment 12 and fresh food compartment 14. Therefore, the particular construction and arrangement of the various parts of temperature control unit 20 as described above is presented for exemplary purposes and it should be readily understood that various changes in the design of control housing 22 and its components can be made without departing from the spirit of the invention. However, for the sake of completeness, control housing 22 also preferably includes a pair of laterally spaced rear projections 108 and 109 which are adapted to be received in aligned holes (not shown) formed in a rear wall of a liner that defines fresh food compartment 14 for use in mounting control housing 22 to mullion 16. In addition, control housing 22 is formed with fore-to-aft spaced mounting bosses 112 and 113 which are adapted to receive screws or the like type fasteners for additionally securing control housing 22 in a desired operational position.

Figures 2, 3:
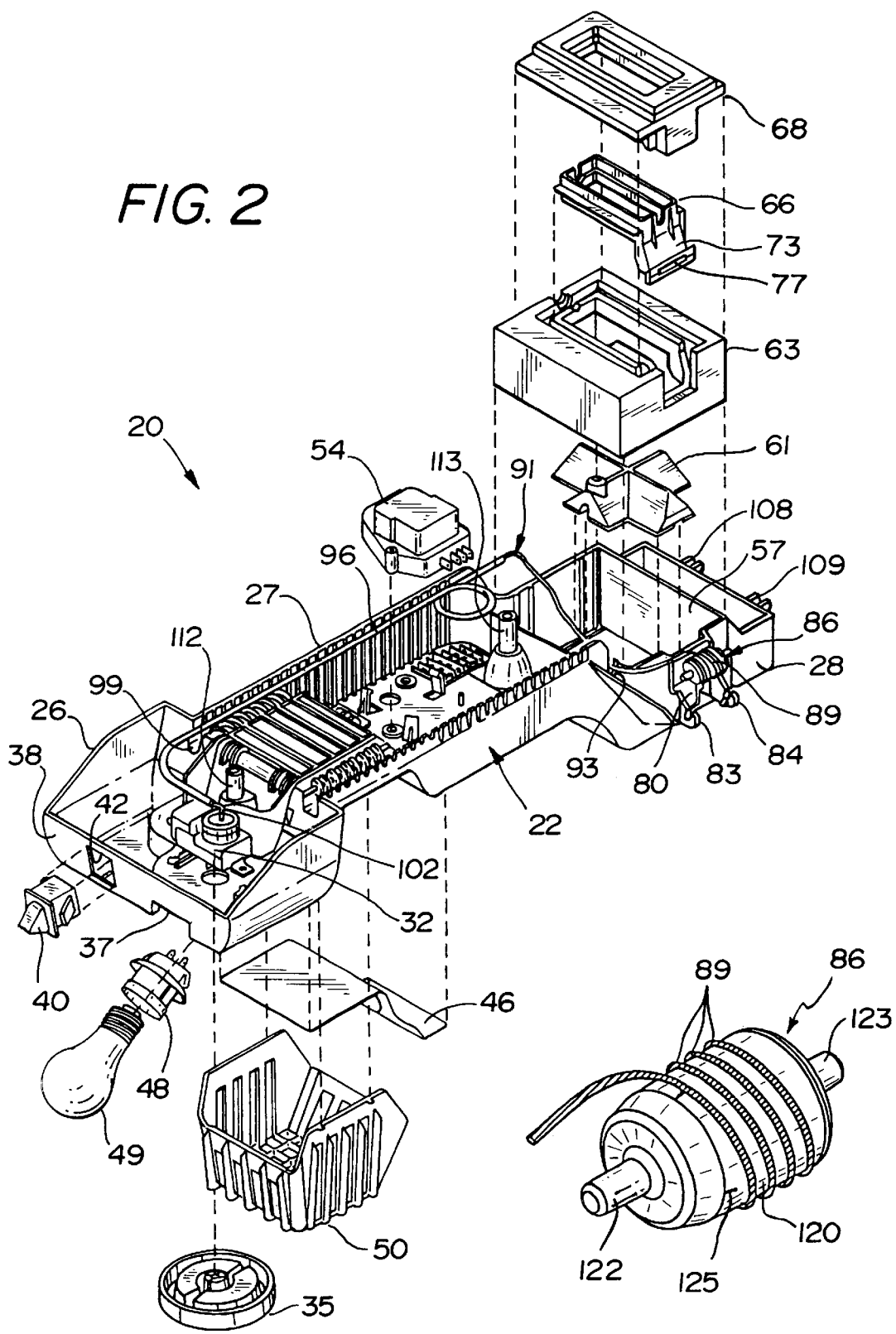
FIG. 2 is an exploded perspective view of the control system of FIG. 1.
FIG. 3 is a perspective view of a thermal mass and temperature sensing element incorporated in the control system of the present invention.

As shown in FIG. 3, thermal mass 86 includes a central body portion 120 about which the first end portion 89 of capillary tube 91 is wrapped. In this preferred embodiment shown, central body portion 120 is generally cylindrical in shape while tapering at its ends and thermal mass 86 also includes a pair of axially extending mounting stub shafts 122 and 123 for use in securing thermal mass 86 to leg members 83 and 84 of control housing 22. As shown in this figure, central body portion 120 is also preferably formed with various skives 125 arranged around the peripheral edge thereof, particularly on the side of central body portion 120 from which capillary tube 91 leads into cut-out section 93. Skives 125 are preferably provided to assure that capillary tube 91 does not unravel or pull off of thermal mass 86 in this side. It has been found that four equally spaced skives 125 provided at this section of central body portion 120 assures that capillary tube 91 will be maintained in the desired wrapped addition. Of course, providing other structure to perform the function of skives 125 will also be well within the scope of the invention and the skill of an ordinary designer in this field.

Incorporating thermal mass 86, wrapping capillary tube 91 thereabout, positioning the thermal mass in an air inlet to the fresh food compartment 14 and assuring that mass 86 receives a flow of air thereover during on-cycle times of the refrigeration circuit has been found to minimize the energy consumption of refrigerator 10 versus prior proposed temperature control arrangements. In general, thermal mass 86 acts as a heat sink or thermal capacitor, thereby increasing the temperature response conveyed to thermostat unit 32 through capillary tube 91 at the end of on and off cycles of the refrigeration circuit. In other words, when the refrigeration circuit is initially activated following an off cycle, it will take longer for thermal mass 86 to cool down to the temperature needed to be conveyed to thermostat unit 32 through capillary tube 91 in which to turn off the compressor. Following an on-cycle, it will likewise take longer for thermal mass 86 to assume the temperature of the overall fresh food compartment 14 in order to reactivate the refrigeration circuit.

The particular size of the thermal mass 86, as well as the percentage of air flowing thereover as defined by side opening 77 of diverter portion 73 can be adjusted to obtain various thermal mass biasings. This allows for more flexibility in the control of the temperatures in freezer and fresh food compartments 12 and 14, as well as the overall refrigerator performance. In addition, by controlling the mass size, location and damper design, variances in the cycles per day between refrigerator cabinets which vary in size and environments of operation can be minimized. This variance is therefore decreased by increasing the sensor temperature response with the thermal mass at the end of the on and off cycles. It should be noted that, at different ambient conditions, the control system does not maintain corresponding compartment temperatures. Instead, the control system is designed to provide nearly equal temperature changes in both compartments 12 and 14. Therefore, the sensitivity of the overall control system can be regulated in an easy manner that can be customized to a particular cabinet design, as well as varying ambient conditions.

In the preferred embodiment, it should be noted that the flow of air is preferably directed over the entire thermal mass 86. It is for this reason that thermal mass 86 is positioned in the manner described above. Arranging thermal mass 86 in this manner greatly limits the condensation of moisture upon the mass. In addition, air deflected off thermal mass 86 will preferably not hit any other surface directly adjacent to the mass. This will minimize turbulence in the area of the thermal mass and result in a more effective overall control system.

Figure 4:
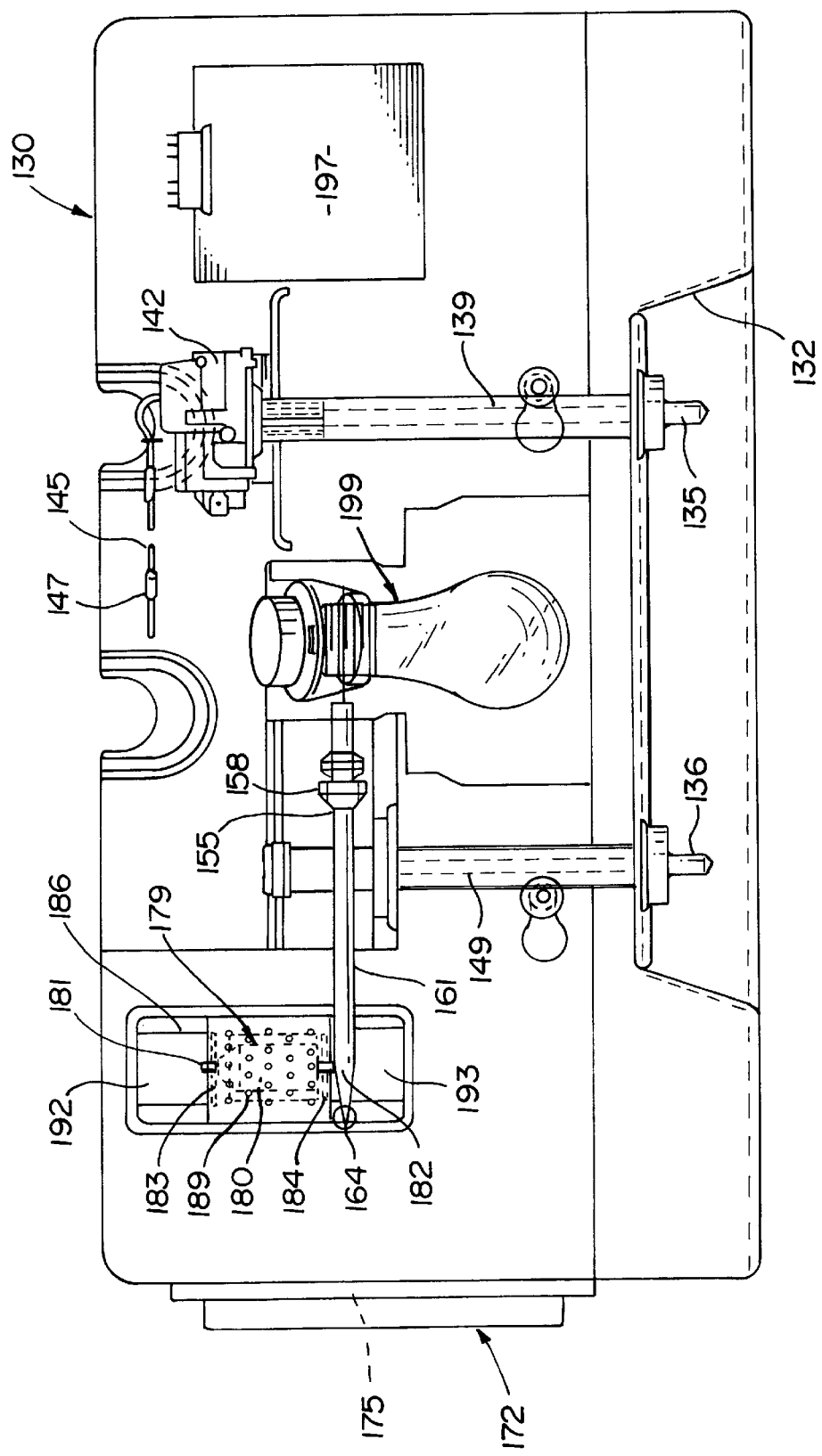
FIG. 4 is a schematic top view of the main components of a temperature control system constructed in accordance with the present invention for use in a side-by-side refrigerator.
Figure 5:
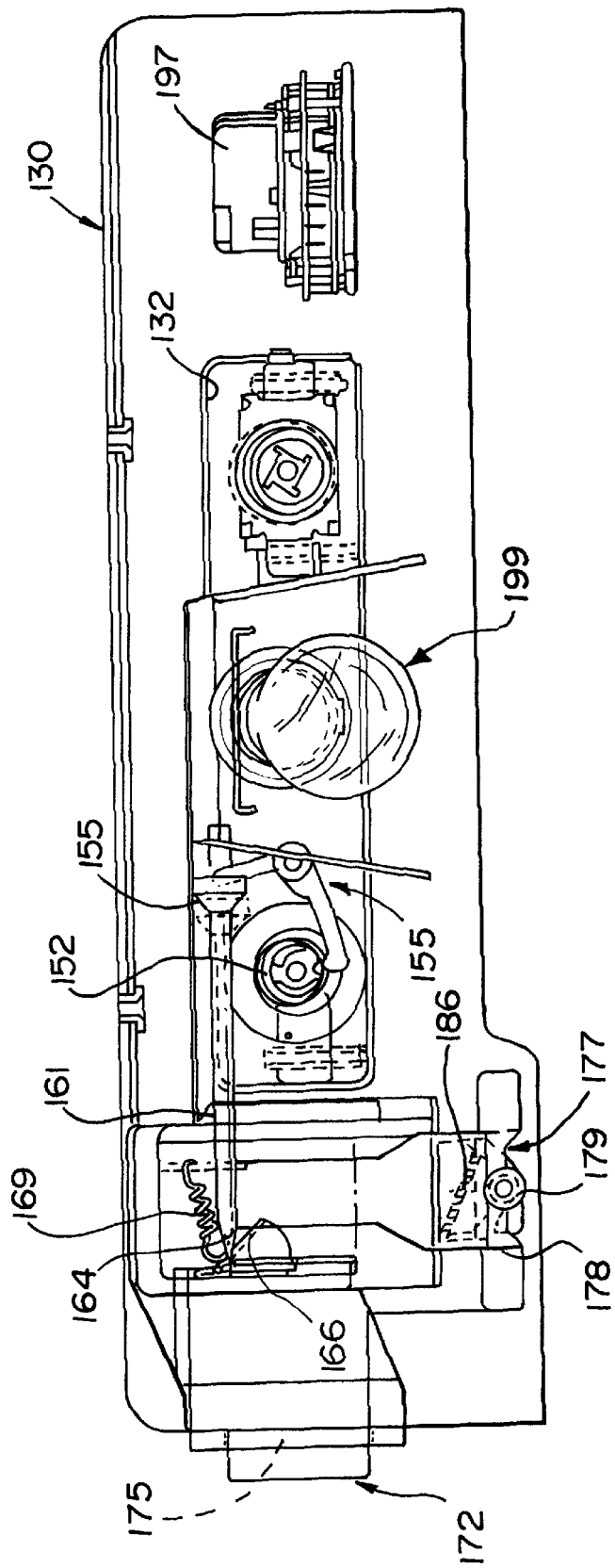
FIG. 5 is a schematic front view of the main components of the side-by-side control system arrangement of FIG. 4.

FIGS. 4 and 5 are directed to an embodiment wherein a thermal mass is utilized in connection with a temperature control and air flow system between freezer and fresh food compartments of a side-by-side refrigerator. In general, the application of the present invention to a side-by-side refrigerator is commensurate with that of the top mount design described above. However, the flow of air directed over the thermal mass in the top mount embodiment is generally at a higher velocity when compared to that of a side-by-side configuration. In addition, due to the general differences between the air flow between the freezer and fresh food compartments of these refrigerator styles, it has been found that applying the use of a thermal mass in a side-by-side design develops a quicker warming of air around the mass during off cycle time periods. Therefore, when applied to a side-by-side refrigerator in accordance with the preferred embodiment of the invention, the physical design of the overall control system is different, while the main objectives are the same as those discussed above.

As shown in these figures, a control housing 130, which is adapted to be attached to an upper top portion of a fresh food compartment of a side-by-side refrigerator, includes a recessed front area 132 provided with a pair of rotatable control knobs 135 and 136. Control knob 135 has associated therewith an actuating shaft 139 that is used to adjust a thermostat unit 142. Attached to thermostat unit 142 is a capillary tube 145 that is preferably provided with a covering sleeve 147. It should be recognized that, for simplicity of FIG. 4, only a portion of capillary tube 145 has been depicted.

Control knob 136 also has associated therewith a shaft 149 that is attached to a cam member 152 such that rotation of control knob 136 causes cam member 152 to also rotate. Cam member 152 is in engagement with a leg of a rocker arm 155 that is pivotally attached to control housing 130. Another leg of rocker arm 155 is in abutment with an enlarged engagement element 158 of a linearly shiftable actuating rod 161. Actuating rod 161 includes a tip 164 that abuts a damper plate 166 of an overall damper unit (not separately labeled). In the preferred embodiment, damper plate 166 is biased by a spring 169 into a fully open position and can be selectively closed by varying degrees by the shifting of actuating rod 161. As is known in the art, damper plate 166 is arranged in an air passageway 172 having a first end 175 exposed to a freezer compartment of the side-by-side refrigerator and a second end 177 (see FIG. 5) that defines an inlet to a fresh food compartment.

Mounted within air passageway 172 at second end 177 is a holder 178 for a thermal mass 179. As in the previous embodiment, thermal mass 179 includes a central body portion 180, as well as opposing stub shafts 181 and 182 projecting therefrom. Holder 178 is provided with a pair of leg members 183 and 184 to which stub shafts 181 and 182 are attached in order to support thermal mass 179 at the inlet to the fresh food compartment.

In order to limit the air velocity to thermal mass 179 during compressor on-time and to reduce the warming of thermal mass 179 during off-times by restricting air movement near mass 179, a diffuser plate 186 is provided above and at a position upstream of thermal mass 179. Diffuser plate 186 is preferably attached to holder 178 and formed with a plurality of air flow holes 189 which are spaced to reduce the possibility of ice and moisture formation. The diffuser plate 186 is also preferably formed with a pair of elongated side ports 192 and 193 which allow for air flow to drop down at different locations within the fresh food compartment in order to reduce temperature stratification within the compartment. For the sake of completeness, a defrost timer 197 and a lighting unit 199 are also depicted.

As indicated above, the application of the present invention in this side-by-side refrigerator embodiment is commensurate with that of the top mount design fully described above. For this reason, the operation of the overall control system will not be reiterated here. Of course, it should be understood that capillary tube 145 is actually routed to and wrapped around thermal mass 179 in the manner identical to that described above with respect to capillary tube 91 and thermal mass 86. In any event, both of these embodiments provide a control system that allows for more flexibility in the control of the refrigerator compartment temperatures, as well as the overall refrigerator performance through the use of a thermal mass associated with a temperature sensor for one of the compartments.

Again, the thermal mass size, location and damper design can be altered in accordance with the present invention depending upon the size, style and ambient conditions associated with the refrigerator to which it is applied in order to achieve the desired cycles per day for minimal energy consumption. Therefore, although described with respect to preferred embodiments of the invention, it should be readily understood that various changes and/or modifications can be made to the invention without departing from the spirit thereof. In general, the invention is only intended to be limited by the scope of the following claims.

We claim:

1. In a refrigerator with a freezer compartment and a fresh food compartment separated by a partition having an opening therein, a system for controlling temperatures in and a flow of air between the compartments, said controlling system comprising:

a housing adapted to be mounted in the refrigerator, said housing including a portion defining an air passageway in fluid communication with said opening for directing the flow of air from the freezer compartment to the fresh food compartment, with the air passageway terminating in a fresh food compartment inlet;

a thermal mass element secured to said housing adjacent the fresh food compartment inlet;

a temperature control unit mounted in said housing; and a temperature sensor having a first portion wrapped about the thermal mass element and a second portion connected to said temperature control unit.

2. The controlling system according to claim 1, wherein the temperature sensor comprises a capillary tube.

3. The controlling system according to claim 2, further comprising means for regulating the flow of air over the thermal mass element.

4. The controlling system according to claim 3, wherein said regulating means comprises a diverter member mounted in the air passageway.

5. The controlling system according to claim 4, wherein the diverter member forms part of an adjustable damper unit positioned in the air passageway.

6. The controlling system according to claim 3, wherein said regulating means comprises a diffuser member interposed in the air passageway, directly upstream of the thermal mass element.

7. The controlling system according to claim 6, wherein the diffuser member comprises a plate provided with a plurality of spaced through holes.

8. The controlling system according to claim 1, wherein the thermal mass element is formed of aluminum.

9. In a refrigerator with freezer and fresh food compartments separated by a partition, a system for controlling the temperature in flow of air between the compartments through an air passageway that terminates in a fresh food compartment inlet, said controlling system comprising:

a temperature control unit;

a thermal mass element positioned adjacent the fresh food compartment inlet; and a capillary tube having a first end wrapped about the thermal mass element and a second end connected to the temperature control unit.

10. The controlling system according to claim 9, wherein the thermal mass element is formed of aluminum.

11. The controlling system according to claim 9, further comprising means for regulating the flow of air over the thermal mass element.

12. The controlling system according to claim 11, wherein said regulating means comprises a diverter member mounted in the air passageway.

13. The controlling system according to claim 12, wherein the diverter member forms part of an adjustable damper unit positioned in the air passageway.

14. The controlling system according to claim 11, wherein said regulating means comprises a diffuser member interposed in the air passageway, directly upstream of the thermal mass element.

15. The controlling system according to claim 14, wherein the diffuser member comprises a plate provided with a plurality of spaced through holes.

* * * * *